Figure 1:
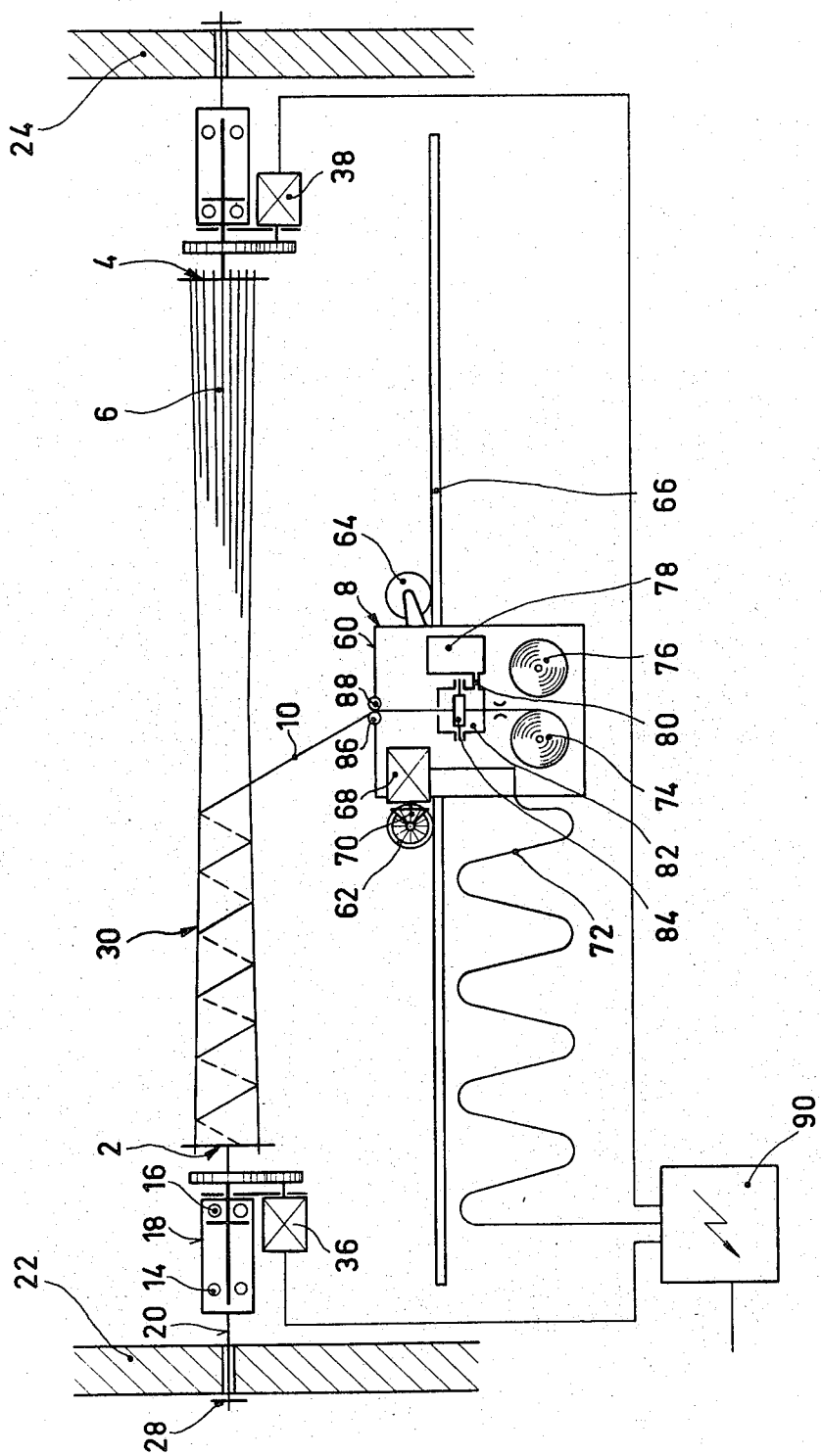

United States Patent [19]

Frehner

[11] 4,350,549

[45] Sep. 21, 1982

[54] METHOD AND APPARATUS FOR THE PRODUCTION OF HOLLOW BODIES BY WINDING

[76] Inventor: Roland Frehner, Switzerland

[21] Appl. No.: 98,314

[22] Filed: Nov. 28, 1979

Related U.S. Application Data

[63] Continuation of Ser. No. 881,788, Feb. 27, 1978, abandoned.

[30] Foreign Application Priority Data

Feb. 27, 1977 [CH] Switzerland ............... 002377/77

[51] Int. Cl.³ .................................. B65H 81/00
[52] U.S. Cl. ............................... 156/161; 156/162; 156/175; 156/425; 428/36; 428/398
[58] Field of Search ............... 138/179, 144; 156/169, 156/172, 175, 173, 425, 161, 162, 165, 180, 441, 171, 350; 242/7.02, 7.21; 428/35, 36, 398

[56] References Cited

U.S. PATENT DOCUMENTS

| | | | |
|---|---|---|---|
| 2,870,793 | 1/1959 | Bailey | 138/78 |
| 3,013,584 | 12/1961 | Reed et al. | 108/145 |
| 3,080,700 | 3/1963 | Michael | 57/1 |
| 3,260,796 | 7/1966 | Hirtzon | 156/172 |
| 3,433,696 | 3/1969 | Michael | 156/425 |
| 3,436,289 | 4/1969 | Hardwick | 156/175 |
| 3,462,907 | 8/1969 | McKean | 52/721 |
| 3,649,401 | 3/1972 | Gunnerson | 156/175 |
| 3,784,441 | 1/1974 | Kaempen | 156/161 |
| 3,813,098 | 5/1974 | Fischer et al. | 138/141 |
| 3,813,837 | 6/1974 | McClain et al. | 52/309 |
| 3,922,827 | 12/1975 | Rosenblatt | 52/245 |
| 3,942,296 | 3/1976 | Meyer | 52/296 |
| 4,063,838 | 12/1977 | Michael | 156/180 |

FOREIGN PATENT DOCUMENTS

192337 2/1923 United Kingdom .
717699 11/1954 United Kingdom .

*Primary Examiner*—Michael W. Ball
*Attorney, Agent, or Firm*—Darby & Darby

[57] ABSTRACT

A method and apparatus for producing hollow bodies by stringing a plurality of filaments or bands between a pair of grip means to form a winding core which becomes a part of the body, moving a reciprocating winding apparatus parallel to the axis of the core and winding filaments or bands around the core. The filaments or bands wound around the core are of a resin impregnated plastic.

10 Claims, 4 Drawing Figures

METHOD AND APPARATUS FOR THE PRODUCTION OF HOLLOW BODIES BY WINDING

This application is a continuation of prior copending application Ser. No. 881,788, filed Feb. 27, 1978, now abandoned.

It is the object of the invention to provide a method for the production of hollow bodies by winding a filamentous or band type material on a core, whereby bodies of different dimensions can be produced in a simple manner without the need to produce a core of another material in a separate process. This problem is solved in that a winding core is formed by stretching numerous filaments or bands, so that the winding core, as a lost core, forms part of the body to be produced.

This may be achieved in that, after the wrapping of a first core, over the body thus formed, parallel to the filaments or bands of the first core, additional filaments or bands are strung. This operation may be repeated several times until the desired wall thickness of the hollow body is reached. The filaments or bands forming the core and any additional filaments or bands to be strung, in the following called skein material, may be secured in the zone of the circumference of two clamping bodies or grips, whose relative distance is adjusted according to the axial length of the body to be produced. The grips are rotated, for example by a drive for each, and the wrapping material is supplied by a reciprocating feed system. As skein material and wrapping material, resin-impregnated glass fiber rovings may be used, so that a firm lamination results as the material hardens. A resin is suitable, e.g. polyester.

For the execution of the method there is proposed further a winding machine, which is characterized by two grips mounted spaced from each other coaxially and rotatably and connected with a rotary drive, said grips having means for the attachment of filaments or bands to be strung between the two grips, and by a filament or band feed, with means for its guiding and its reciprocating movement on a path running parallel to the axis of rotaion of the grips.

Figure 2:
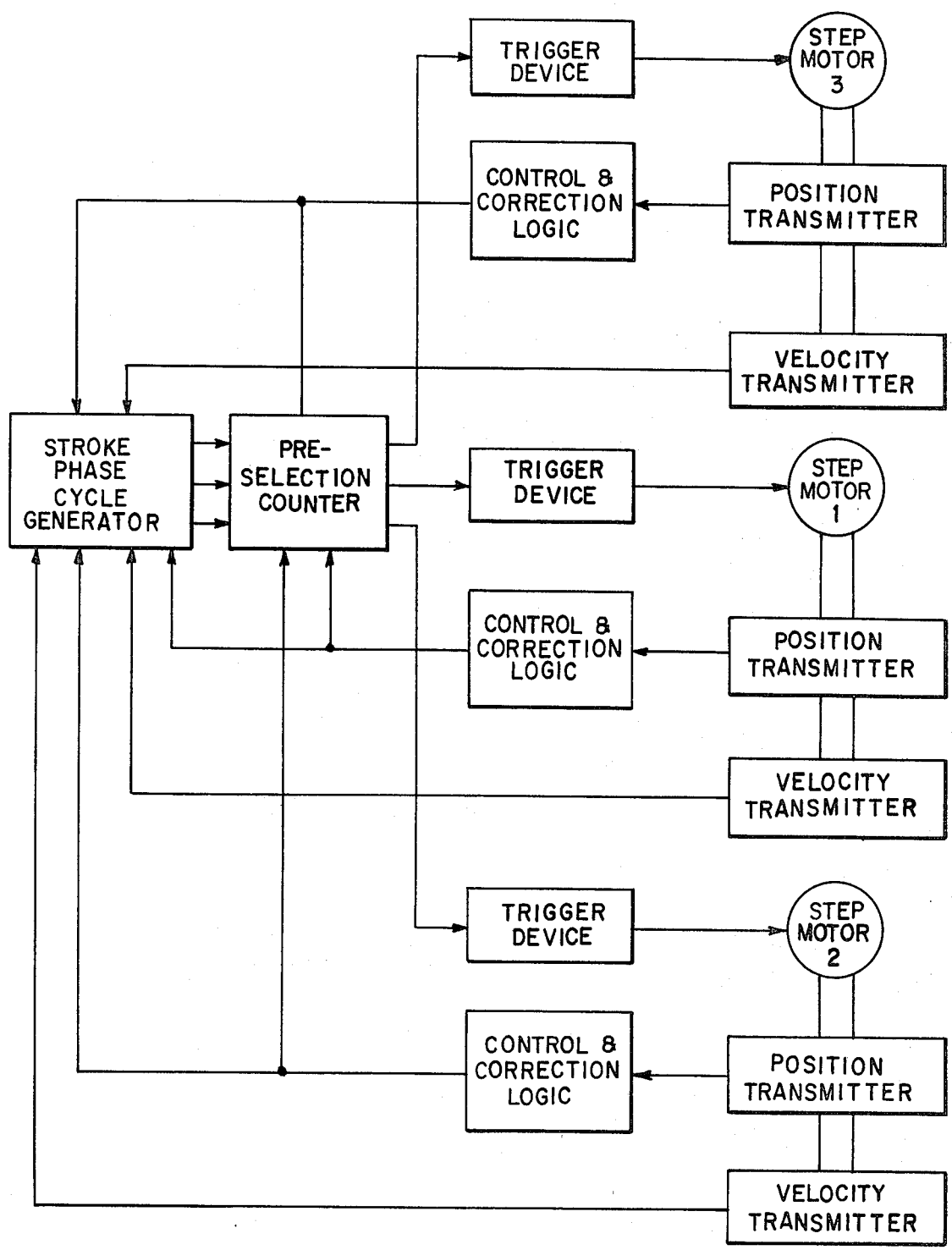
Figures 3, 4:
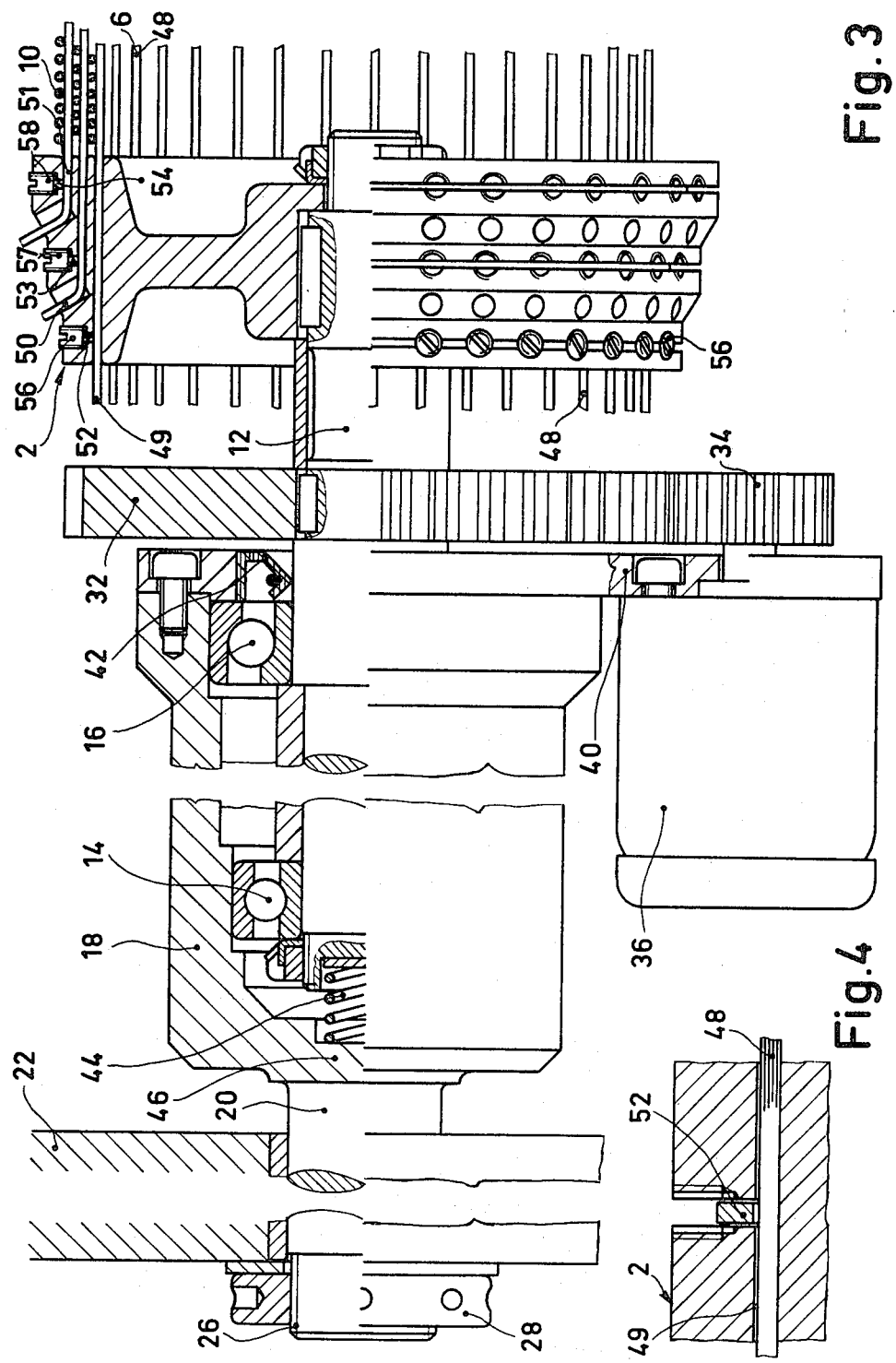

In the following, the invention will be further explained with reference to an embodiment illustrated in the drawings, in which:

FIG. 1 shows a diagram of a winding machine in front view or in top view;

FIG. 2, a wiring diagram of a system for the control of the various drives of the winding machine;

FIG. 3 a cross-sectional top view of one of the grips of the winding machine according to FIG. 1, with its suspension and its drive; and FIG. 4, an enlarged partial secton of the grip with a means for the attachment of one end of a filament or band.

The winding machine according to FIG. 1 has two grips 2, 4 for the skein material 6 and a feed system 8 for the wrapping material 10.

Both grips 2, 4 are supported, according to the representation in FIG. 3, by a shaft 12, which is mounted by a radial bearing 14 and an axial bearing 16 in a cup-shaped housing 18. Housing 18 has a shank 20, extending parallel to shaft 12 or coaxial therewith, which shank is mounted axially displaceable in a frame member 22, 24. At the end of shank 20 is a screw thread 26, so that a nut 28 meshing with the thread 26 can serve to tension the skein material. To absorb the tension, the two frame members 22, 24 are connected by a part of the machine frame not shown. For the production of hollow bodies 30 of different lengths the two frame members 22, 24 may be relatively adjustable by means not shown, e.g. a spindle drive. This adjusting means or spindle drive may also serve for the precise setting of the tension of the skein material, e.g. also as a function of the winding operation, to obtain a certain hyperboloid form.

On shaft 12 is secured a gear 32, in which engages the pinion 34 of an electric motor 36, 38. The motor is flanged to a housing plate 40 which closes the cup-shaped housing 18 around shaft 12. A packing ring 42 serves as seal between shaft 12 and this housing plate. A helical spring 44 arranged between the bottom wall 46 of housing 18 and the end of shaft 12 prevents the balls of the axial bearing 16 from falling out of the races when shaft 12 is displaced with grip 2 empty. The mounting and drive of grip 4 opposite grip 2 occurs in the same manner as shown in FIG. 3, except that the corresponding means are arranged reversed or in mirror symmetry thereto.

The attachment of the skein material 6 or of the numerous glass fiber rovings 48 can occur in the manner shown in FIGS. 3 and 4 by clamping. The roving is passed through one of the bores 49 to 51, and a lock ring 52 to 54, inserted in a groove intersecting with the respective bore, is pressed by screws 56 to 58 onto the roving 48. First the rovings are fastened in the radially inner bores 49 until they form in circumferential direction a body, e.g. a cylindrical body, consisting of numerous parallel roving, which serves as a first winding core. Another layer of axis-parallel rovings is stretched between the grips 2 and 4 preferably only after the first core has been wrapped with one or more layers of the resin-impregnated rovings forming the wrapping material 10, as can be seen from the view in transverse section of FIG. 3.

Instead of the attachment by means of lock rings 52 to 54 and screws 56 to 58, the attachment may be effected by hooks not shown, which are secured to a grip 2, 4. To this end, a roving is passed without interruption from one grip 2 to the other grip 4 and there over one of the hooks. Instead of hooks, groove type notches may be provided in the grips. Further, each grip may consist of several slotted rings to be fitted one over the other in that, after the smallest slotted ring has been covered, the next larger ring is slipped over the smallest ring after having been held in a space between gear 32 and the smallest ring. Lastly the attachment to the grips may be by means of clamping eccentrics, each connected with a clamping lever.

If the winding core is formed by moving a roving back and forth over fastening members at the grips 2, 4, the riciprocating guiding or feed of the roving may be effected by means of the feed system 8. For this purpose, a guide arm not shown with guide rolls may be secured on the housing 60 of the feed system.

The feed system 8 or respectively its housing 60 is guided by wheels 62, 64, on a track 66, and its reciprocating movement occurs by the drive of an electric motor 68, which is in drive connection with wheel 62 through a bevel gear 70. The current supply to the motor occurs over the sinusoidally laid cable 72. In housing 60 are arranged supply rolls 74, 76 for the roving material as well as a supply tank 78 for resin material. In a vat 82 connected with the supply tank 78 via a line 80, the roving is impregnated with resin, by passing it under a roll 84 mounted in the vat. From the vat the roving runs through a pair of guide rolls 86, 88 and thence is wound helically due to the rotation of the winding body. It is understood that several rovings may be fed simultaneously by the feed system.

To control the speed of rotation of the grips 2, 4, the reciprocating movement of the feed system 8, and the winding tension, a control unit 90 is provided, which is shown schematically in FIG. 2. Different control programs serve to produce differently shaped hollow bodies or respectively different winding patterns. With increasing winding tension in relation to the tension of the filaments of the winding core, the hyperboloid form of the produced hollow body is more pronounced. The mean diameter of the hollow body can be determined by selection of the diameter of the grips 2 and 4.

The method of the invention is suitable in particular for the production of poles, e.g. for the installation ("guiding") of electric lines, telephone wires, etc.

What is claimed is:

1. Method for the production of an elongated hollow body comprising the steps of:

providing a pair of spaced gripping members with an area between them, attaching longitudinally under tension a plurality of filaments or bands between the gripping members without support in the area between the gripping members in order to form an elongated hollow winding core as a lost core part of the final hollow body to be produced, applying tension to the filament or bands along their lengths via tensioning means disposed completely outside the area between the gripping members, winding a filamentous or band type wrapping material around and along the length of said filaments or bands forming said hollow core under controlled tension so as to deflect the filaments or bands of the hollow core inwardly to produce a closed body having a generally hyperboloid shape, solidifying the hollow body in its hyperboloid shape, releasing the gripping members, and removing the completed hollow body from the gripping members without disassembling the gripping members and tensioning means.

2. Method according to claim 1 wherein the stretching step comprises fastening the filaments or bands forming the core in a circular pattern defined by each of the two gripping members to define a generally cylindrical hollow winding core, and the step of applying tension comprises adjusting the relative distance between the grips according to the axial length of the body to be produced.

3. Method as in claim 2 further comprising the steps of rotating the gripping members by a drive, and winding the wrapping material around and along the core by a reciprocating feed system.

4. Method according to claim 3 wherein the step of stretching the filaments or bands for the formation of the core is carried out by the feed system for the wrapping material between two grips through the reciprocating movement of the feed system.

5. Method according to claim 2 further comprising the step, after the winding of wrapping material around and along the core, of interrupting the winding, attaching and stretching additional filaments or bands under tension between the gripping members, and continuing the winding of wrapping material so that the body of filaments stretched over a layer of wrapping material is enclosed between two layers of wrapping material.

6. Method according to claim 1 wherein the winding is carried out with resin-impregnated glass fiber rovings, the resin solidifying the body.

7. A machine for producing hollow elongated bodies comprising:

a pair of opposed coaxial grip means which are rotatably mounted and which have an area between them, means for rotating said grip means, means for attaching a plurality of first spaced filaments or bands between the pair of grip means and stretching them longitudinally and unsupported between the pair of grip means so as to define a hollow elongated winding core, the hollow winding core being completely free of structural members in the area between the grip means, tensioning means coupled to said grip means for applying longitudinal tension to said first filaments or bands, said tensioning means being disposed completely outside the area between the pair of grip means, and filament or band feed system means reciprocating on a path parallel to the axis of rotation of the pair of grip means and the winding core, for winding under controlled tension at least one second filament or band around the length of the first filament or bands positioned between said grip means so as to deflect the hollow core inwardly and to thereby produce an elongated closed hollow body having a given hyperboloid form.

8. Winding machine according to claim 7 further comprising for each grip means a shaft mounted in axial relationship to the elongated hollow body within a housing, said grip means being connected to said shaft, drive means connected to each said shaft for rotation thereof, and an axially displaceable tensioning shank means which is mounted in a frame member of the feed system means completely outside the area between the pair of grip means.

9. Winding machine according to claim 8 further comprising means for adjusting the distance between the two opposite grip means to determine the axial length of the hollow body to be produced.

10. Winding machine according to claim 7 wherein at the circumference of each of the grip means receiving apertures are provided for the first filaments or bands to be stretched, said apertures being arranged in concentric circle rows, each of said rows having different radial distance from the axis of rotation of the grip means.

* * * * *